United States Patent [15] 3,691,230
Wesselingh [45] Sept. 12, 1972

[54] PROCESS FOR PRODUCING CARBOXYLIC ACIDS AND ESTERS

[72] Inventor: Johannes A. Wesselingh, Amsterdam, Netherlands

[73] Assignee: Shell Oil Company, New York, N.Y.

[22] Filed: May 28, 1970

[21] Appl. No.: 41,462

[30] Foreign Application Priority Data

July 10, 1969 Netherlands..............6910591

[52] U.S. Cl. ........260/497 R, 260/410.9 R, 260/413, 260/531 R, 260/533 A, 260/540, 261/87, 261/93
[51] Int. Cl..............................................C07c 51/14
[58] Field of Search ....261/87, 93; 260/533 A, 497 R

[56] References Cited

UNITED STATES PATENTS 2,590,581 3/1952 Shirley..........................261/93
2,865,618 12/1958 Abell............................261/93
2,928,665 3/1960 Epprecht.....................261/87
2,293,183 8/1942 Walker........................261/93
3,527,779 9/1970 Paulis et al.............260/533 A Primary Examiner—Lorraine A. Weinberger
Assistant Examiner—Richard D. Kelly
Attorney—Harold L. Denkler and Theodore E. Bieber

[57] ABSTRACT

A method and apparatus for controlling the quantity of gas in a stream of liquid by circulating the stream of liquid within a vessel and introducing the gas into the vessel into contact with the stream of liquid both above and below the surface of the stream of liquid. The quantity of the gas present in the circulating stream of liquid is controlled by selectively adjusting either the velocity of the stream of liquid within the vessel or the depth of the introduction of the gas into the vessel below the surface of the stream of liquid.

8 Claims, 1 Drawing Figure

PROCESS FOR PRODUCING CARBOXYLIC ACIDS AND ESTERS

BACKGROUND OF THE INVENTION

1. Field of the Invention

The invention relates to a precess for the automatic control of the quantity of gas in a circulating stream of liquid, in which the gas is dispersed in the form of bubbles, through supply of gas that is present over the liquid. The invention also relates to an apparatus that is suitable for the process according to the invention to be carried out therein.

2. Description of the Prior Art

In carrying out reactions in the liquid phase in reactors, where gas present in the reactor has to be taken up in a liquid likewise being present in the reactor (gas present in the liquid being consumed as a result of the reaction), in many cases it is possible for the quantity of gas in the liquid to be kept at the desired level (even when this level is high) by imparting a vigorous motion to the liquid and to the interface between liquid and gas. Sufficient agitation in a reaction vessel of a not too complicated shape can generally be effected by vigorous stirring. With such reaction vessels, problems may occur in relation to the control of the temperature, because with highly exothermic reactions it is mostly impossible to incorporate cooling surface (for instance in the form of cooling tubes) having an area that is sufficiently large for adequate removal of the heat, as a result of which the temperature in the reactor may rise to undesirably high values. For that reason, in such cases, sometimes use is made of a tubular vessel containing an inner tube as reactor. The liquid present in a reactor of this type is circulated by pumping and within the inner tube moves in one direction and between the inner tube and the wall of the tubular vessel in the opposite direction. By installing cooling tubes parallel to the long axis of the reactor—which tubes may be fitted both on the inside and on the outside of the inner tube—a very large cooling surface may be obtained so that the contents of the reactor can be prevented from rising to excessive temperature values. In a reactor of this type, that is to say, where liquid is circulated, the supply to the liquid of a sufficiently large quantity of gas that is present over the liquid presents a problem, particularly when the reactor is mounted vertically, because the area of the gas-liquid interface is comparatively small and because it is impossible to impart a motion to that gas-liquid interface which is sufficiently vigorous to ensure that the desired quantity of the gas that is present over the liquid is taken up in the liquid.

It is true that provision for sufficient gas to be taken up in the liquid may be made by introducing gas under pressure at one or more places in the reactor where liquid is present, but this requires complicated equipment for accurate metering of the gas and, in addition, there is a risk of too much gas being introduced into the liquid and remaining therein when the consumption of the gas decreases (for instance owing to a decrease in the rate of the gas-consuming reaction). When too much gas is present in the liquid, then, owing to the formation of large gas bubbles, the circulation of the liquid may be impeded and, as a result, excessive temperatures may occur locally.

SUMMARY OF THE INVENTION

It is an object of this invention to provide a method and apparatus by which gas is taken up in a liquid to a sufficient extent and by which the quantity of gas that is present in a liquid is controlled automatically.

According to the invention, the gas is introduced through a tube below the the surface of the liquid, the quantity of gas in the circulating stream of liquid being controlled by adjusting the velocity of the stream of liquid and/or the depth to which the tube is immersed.

BRIEF DESCRIPTION OF THE DRAWING

The drawing is a vertical diagrammatic view of suitable apparatus for carrying out the method of my invention.

DESCRIPTION OF THE PREFERRED EMBODIMENT

Referring to the drawing, the method according to our invention may be carried out in many different types of apparatus, provided these types of an apparatus meet the conditions that it should be possible for liquid to be circulated in them and that it should be possible for a gas to be present over the circulating liquid.

Such apparatus is represented diagrammatically in the drawing. This apparatus consists of a cylindrical vessel 1 that is mounted vertically and is closed on either end. The vessel is provided with at least one liquid supply device 2 and at least one liquid discharge device 3. In addition, at the upper end of the vessel there is present at least one gas supply device 4. Inside the vessel, in a coaxial position relative to it, there is present an inner tube 5 which at or near its ends communicates with the vessel. In the vessel 1, one or more pumps or stirrers 6 are provided by which the liquid may be made to circulate through the interior 7 of the inner tube 5 and the annular channel 8 outside the inner tube 5. The apparatus is characterized by the presence of at least one tube 9 in the vessel 1 near the upper end, each tube 9 having a mouth 10 near the upper end of the vessel 1 opening into the gas that is present in the upper part of the vessel 1, and a mouth 11 opening below the surface of the liquid that may be made to circulate. The liquid-gas interface is represented by 12; the direction of the arrows 13, 14 and 15 indicates the direction of flow of the liquid within vessel 1. Only one such tube 9 is illustrated in the drawing for convenience of illustration.

To ensure an optimum uptake of the gas in the liquid, the mouth 11 of the tube 9 below the surface 12 of the liquid is so arranged that the outward perpendicular on the plane of the mouth 11 of the tube 9 is at an angle of 0° – 90° (0° and 90° being included) to the direction of flow of the liquid. Mostly, use is made of a tube 9 of which the section before the mouth below the surface of the liquid is horizontal or substantially horizontal.

It is an advantage that downstream of the mouth 11 of the tube 9 below the surface 12 of the liquid, there are one or a plurality of baffles 16 which facilitate the reversal of the direction of the flow of the liquid.

The inner tube 5 may partly rest on the lower end of the vessel 1 and/or be connected to the upper end of the vessel 1, provided that the possibility of circulation of liquid through the inner tube 5 and the annular channel 8 outside that tube 5 is retained by arranging for openings to remain in the inner tube 5.

Generally, in all supply and discharge devices, conventional valves 17, 18, 19 and 20 are provided as indicated, by which the rate of supply and discharge of liquid or gas may be controlled.

The number of liquid supply devices 2 on the vessel 1 may be larger than one and this is of importance particularly when one wants to supply more than one liquid. Thus, in the preparation of carboxylic acids from olefins, water and carbon monoxide under the influence of an acid catalyst, the olefin and the catalyst may be supplied separately to the vessel, each by one or more supply devices The number of liquid discharge devices 2 also may be larger than one, but this will not in general be the case. The construction of the discharge device 3 is preferably such that liquid is, but gas is not discharged. Provision for this may be made in known ways, for instance by means of an overflow provided with a liquid seal (not shown).

Naturally, it is also possible for more than one gas supply device 4 to be present.

In a number of cases (for example, in the continuous preparation of carboxylic acids as described hereinabove), it may be desired to discharge gas also from the apparatus, for which purpose a gas discharge device 21 may be provided.

Gas is taken up only if between the velocity of the stream of liquid and the depth of immersion of the tube 9 a relationship exists that can be formulated as follows: $V_1^2 \geq c \cdot g \cdot \Delta h$. In this formula $V_1$ represents the velocity of the stream of liquid at the location of the mouth 11 of the tube 9 below the surface 12 of the liquid, $g$ the acceleration due to gravity, $\Delta h$ the difference in level between the liquid-gas interface 12 and the location of the mouth 11 of the tube 9 below the surface 12 of the liquid, and $c$ a constant whose magnitude is mostly of the order of two if in expressing the quantities $V_1$, $g$ and $\Delta h$ the same units of length and of time are used. By increasing $V_1$ and/or decreasing $\Delta h$, the quantity of gas taken up in the liquid may be made to increase.

The quantity of gas that is present in the liquid in the form of bubbles may be controlled by adjusting the velocity of the stream of liquid and/or the depth of immersion of the tube 9 in the liquid. Mostly the tube 9 is fitted in the vessel 1 so as to have a fixed position; the depth of immersion may then be varied by filling the vessel 1 with liquid up to a higher or to a lower level. The velocity of the stream of liquid may in the first instance be controlled by the speed of the pump or the stirrer 6 to be used for effecting the circulation.

The velocity $V_1$ of the stream of liquid at the location of the mouth 11 of the tube 9 below the surface 12 of the liquid is dependent not only on the speed of the pump or the stirrer 6 providing for the circulation, but also on the quantity of gas in the form of bubbles that is present in the liquid; at a given speed of rotation, the value of $V_1$ is smaller according as the quantity of gas in the form of bubbles is larger.

The gas is drawn by the circulating stream of liquid from the tube 9 via the mouth 11 below the surface 12 of the liquid, taken along in the form of bubbles by the circulating liquid, and, from this liquid, partly consumed, for instance, by a reaction taking place. After the liquid has circulated once, little or no gas is present in the liquid that passes the mouth 11 of the tube 9 below the surface 12 of the liquid. Since, as explained above, $V_1$ is a function of the quantity of gas in the form of bubbles that is present in the liquid, under conditions of constant gas consumption, after some time a situation will arise where the said gas consumption and the quantity of gas taken up in the liquid via the tube 9 are in equilibrium, the equilibrium being such that the total quantity of gas in the liquid remains constant.

When the reaction rate decreases, the quantity of gas that is present in the liquid will temporarily increase, but because this results in a decrease in $V_1$ and, hence, in less gas being taken up via the tube, after a short time a situation of equilibrium will arise again where a certain quantity of gas in the form of bubbles is present in the liquid. When the gas consumption increases, for instance by an increase in the rate of the reaction, then the velocity of the liquid will increase, and more gas will be taken up in the liquid via the tube 9; thus, here also there is automatic control of the stock of gas in the liquid.

It should be possible for gas to be taken up via the tube 9, that is to say, the tube 9 is preferably mounted so that the stream of liquid exerts suction on the contents of the tube 9. With a view to promoting the suction effect, it is advantageous for the tube 9 to be cut off in such a way that the outward perpendicular on the plane of the mouth of the tube is at an angle of 0° – 90° (0° and 90° included) to the direction of flow of the liquid.

Generally, provision may be made for a part of the tube 9 below the surface 12 of the liquid to be in an entirely or substantially horizontal position, the mouth 11 of the tube 9 in the liquid being located in the horizontal section of the tube 9.

This method may be employed particularly with advantage in those cases where the direction of the circulating stream of liquid is substantially vertical, that is to say, where the distance in the vertical direction covered by the stream of liquid when having circulated once is larger than that in the horizontal direction.

Naturally, the invention is not restricted to the use of a single tube 9: a plurality of tubes, for instance six or eight, may be used, one extreme end of these tubes being located below the surface 12 of the liquid, the other extreme end being located above the surface 12 in the gas that is present over the liquid.

Although the gas may be withdrawn from the bubbles without taking part in a reaction (for example, by physical binding) the method according to my invention is used preferably in processes where a reaction takes place in the circulating stream of liquid, in which reaction gas is taken up from the bubbles.

The method of my invention is particularly suited for the preparation of carboxylic acids or derivatives thereof with the aid of reactions in which carbon monoxide is bound. An attractive method for this purpose consists in reacting one or more olefinically unsaturated compounds such as olefins (or precursors thereof, such as alcohols and ethers) with water (or an alcohol) and carbon monoxide in the presence of a strongly acid component that serves as catalyst. In a preferred embodiment of the method according to the invention where carboxylic acids are formed, the circulating stream of liquid contains a strongly acid water-containing component to which in one or more locations an olefinically unsaturated compound is supplied, the gas consisting entirely or substantially of carbon monoxide.

Suitable strongly acid water-containing components are, for instance, mixtures of hydrogen fluoride and water, sulphuric acid and water, boron trifluoride and water, but preference is given to mixtures of boron trifluoride, phosphoric acid and water. Particularly suitable are mixtures of boron trifluoride, phosphoric acid and water in which the molar ratio between water and boron trifluoride lies in the range between 1 : 1 and 2.3 : 1, and the molar ratio between boron trifluoride and phosphoric acid in the range between 2 : 1 and 20 : 1, but other ratios are also well suitable and by no means excluded.

Very suitable olefinically unsaturated compounds are monolefins or mixtures thereof, particularly monoolefins with from two to 20 carbon atoms. Preference is given to monoolefins from which pivalic acid can form by reaction with CO and water, namely isobutene and oligomers of isobutene, such as the dimer and the trimer.

Instead of, or in combination with, the monoolefins, precursors thereof, such as the alcohols which by separating off water might be caused to change into the relevant olefin or ethers which might conceivably have formed by separation of one molecule of water from two alcohols molecules, may also be used as starting material for the formation of carboxylic acids.

In the preparation of carboxylic acids as described hereinbefore temperatures are applied that lie, for instance, in the range below 150° C., preferably between 60° and 120° C.; very suitable pressures are those between 10 and 250 kg/cm², particularly those between 30 and 150 kg/cm².

The gas being present over the liquid may contain, in addition to carbon monoxide, one or more inert gases (for instance nitrogen), but it is preferred that this gas for the preparation of carboxylic acids in the way described hereinbefore should consist entirely or substantially of carbon monoxide. The olefinically unsaturated compounds added to the reactor contents may contain inert solvents such as hydrocarbons, for instance pentane.

When the reaction has ended, the carboxylic acid formed may be obtained by phase separation of the reactor contents into an organic carboxylic-acid-containing phase and an inorganic phase containing the acid catalyst, which phase separation may be carried out in an apparatus suitable for this purpose, for instance a separating vessel or a centrifuge.

It is preferred that the preparation of the carboxylic acid be carried out continuously, that is to say that the olefinically unsaturated compound is introduced continuously into the reactor and that reactor contents are withdrawn continuously. In the withdrawn reactor contents, the organic carboxylic-acid-containing phase and the inorganic phase containing the acid catalyst are separated from each other and the inorganic phase is recycled to the reactor. As water from the inorganic phase has been used in the formation of the carboxylic acid, a quantity of water equal or substantially equal to the quantity of water consumed is supplied to the reactor, either together with the recycle inorganic phase or not.

It is very suitable for the phases to be separated to be discharged from the reactor with the aid of an overflow.

Owing to the consumption of carbon monoxide in the formation of the carboxylic acid, the pressure in the reactor tends to drop; by replenishment of carbon monoxide under pressure, preferably likewise continuously, the pressure may be kept at the desired level. In the continuous preparation of the carboxylic acid by the method according to my invention (in which the reactor is continually replenished with carbon monoxide under pressure) impurities present in the carbon monoxide (for example, inert gases) will in the long run accumulate in the gas cap over the liquid. For that reason it is advisable, that during the reaction small quantities of the gas in the gas cap over the liquid should be drawn off continuously or discontinuously.

The method according to my invention is also eminently suitable for the preparation of esters from olefins (or precursors thereof). Esters are prepared in a manner analogous to that described hereinabove for the preparation of carboxylic acids, but, instead of water, an alcohol is used, preferably a primary or secondary alcohol, for instance methanol, ethanol, propanol, isopropanol. As in the ester formation, tertiary olefins (or precursors thereof) are incorporated in that part of the ester which is derived from the acid more easily than primary or secondary alcohols do, an ester can be prepared selectively from a tertiary carboxylic acid and a primary or secondary alcohol. Thus, for instance, with methanol as alcohol and isobutene or diisobutene as olefin, methyl pivalate is formed.

I claim as my invention:

1. In a process for producing carboxylic acids at a temperature below 150° C. and at a pressure between 10 and 250 kg/cm² by contacting carbon monoxide gas with a liquid mixture of
   a. monoolefin of from two to 20 carbon atoms; and
   b. catalyst consisting essentially of water, boron trifluoride, and phosphoric acid, in which catalyst
      i. the water to boron trifluoride molar ratio is from 1:1 to 2.3:1 and
      ii. the boron trifluoride to phosphoric acid molar ratio is from 2:1 to 20:1, the improvement of
   a. maintaining carbon monoxide gas above and in contact with the liquid mixture;
   b. vertically circulating the liquid mixture; and
   c. introducing carbon monoxide gas into the vertically circulating liquid mixture at a depth below the gas-liquid mixture interface defined by $$V_1^2 \geq c \cdot g \cdot \Delta h$$

wherein
   $V_1$ is the velocity of the vertically circulating liquid mixture at the point of carbon monoxide gas introduction,
   $g$ is acceleration due to gravity,
   $\Delta h$ is the vertical distance below the gas-liquid mixture interface at which carbon monoxide gas is introduced into the vertically circulating liquid mixture, and $c$ is a constant having a value of 2 where $V_1$, $g$, and $\Delta h$ are defined in consistent units of length and time.

2. The process of claim 1 wherein the vertically circulating liquid mixture periodically passes
   a. upwardly within a tube substantially coaxially disposed within the reaction vessel and
   b. downwardly through the annulus between the tube and the walls of the reaction vessel.

3. The process of claim 2 wherein carbon monoxide gas is introduced into vertically circulating liquid mixture at a location within the coaxially disposed tube.

4. The process of claim 1 wherein carbon monoxide gas is introduced into vertically circulating liquid mixture at an angle of 0° to 90°, inclusive, relative to the direction of flow of vertically circulating liquid mixture.

5. The process of claim 4 wherein carbon monoxide gas is introduced into vertically circulating liquid mixture at an angle of 90° relative to the direction of flow of vertically circulating liquid mixture.

6. The process of claim 1 wherein the monoolefin of from two to 20 carbon atoms is selected from the group consisting of isobutene, isobutene dimer, isobutene trimer, and their mixtures.

7. In a process for producing esters of carboxylic acids at a temperature below 150° C. and at a pressure between 10 and 250 kg/cm² by contacting carbon monoxide with a liquid mixture of
   a. monoolefin of from two to 20 carbon atoms; and
   b. alcohol, boron trifluoride and phosphoric acid;
      i. the alcohol being selected from the group consisting of methanol, ethanol, propane and isopropanol;
      ii. the alcohol to boron trifluoride molar ratio being from 1:1 to 2.3:1; and
      iii. the boron trifluoride to phosphoric acid molar ratio being from 2:1 to 20:1, the improvement of
   a. maintaining carbon monoxide gas above and in contact with the liquid mixture;
   b. vertically circulating the liquid mixture; and
   c. introducing carbon monoxide gas into the vertically circulating liquid mixture at a depth below the gas-liquid mixture interface defined by $$V_i^2 \geq c \cdot g \cdot \Delta h$$

wherein
   $V_i$ is the velocity of the vertically circulating liquid mixture at the point of carbon monoxide introduction,
   $g$ is acceleration due to gravity,
   $\Delta h$ is the vertical distance below the gas-liquid mixture interface at which carbon monoxide gas is introduced into the vertically circulating liquid mixture, and
   $c$ is a constant having a value of 2 where $V_1$, $g$, and $\Delta h$ are defined in consistant units of length and time.

8. The process of claim 7 wherein the monoolefin of from two to 20 carbon atoms is selected from the group consisting of isobutene, isobutene dimer, isobutene trimer, and their mixtures.

* * * * *